United States Patent [19]
Schmid

[11] Patent Number: 6,053,670
[45] Date of Patent: Apr. 25, 2000

[54] FRICTIONALLY CLAMPED TOOL AND HOLDER

[75] Inventor: Konrad Schmid, Lommiswil, Switzerland

[73] Assignee: Fraisa SA, Switzerland

[21] Appl. No.: 09/176,371

[22] Filed: Oct. 21, 1998

[30] Foreign Application Priority Data

Oct. 22, 1997 [EP] European Pat. Off. .............. 97810787

[51] Int. Cl.[7] .............. B26D 1/12; F16B 39/04; F16B 23/00
[52] U.S. Cl. .............. 407/34; 407/40; 407/54; 279/2.08; 411/214; 411/410
[58] Field of Search .............. 407/30, 33, 34, 407/36, 40, 41, 46, 53, 54; 408/231–233; 409/234; 82/160; 279/2.08; 411/204, 214, 222, 374, 403, 410

[56] References Cited

U.S. PATENT DOCUMENTS

| 881,691 | 3/1908 | Hughes | 407/33 |
|---|---|---|---|
| 1,295,873 | 3/1919 | Dodds | 411/403 |
| 2,084,801 | 6/1937 | Hall | 409/233 |
| 3,131,946 | 5/1964 | Newhouser | 279/2.03 |
| 3,144,293 | 8/1964 | De Smidt | 411/403 |
| 5,599,146 | 2/1997 | Scheer | 409/234 |

FOREIGN PATENT DOCUMENTS

| 188-808 | 7/1986 | European Pat. Off. | 407/46 |
|---|---|---|---|
| 7147468 | 8/1973 | France . | |
| 1017882 | 10/1957 | Germany . | |
| 3146005 | 5/1983 | Germany . | |
| 8223278 | 5/1987 | Germany . | |
| 274-374 | 12/1989 | Germany | 279/2.03 |

*Primary Examiner*—Andrea L. Pitts
*Assistant Examiner*—Erica D. Ergenbright
*Attorney, Agent, or Firm*—Bachman & LaPointe, P.C.

[57] ABSTRACT

In a modular system (10), with a holder part (12) for clamping in a spindle of a turning machine and a machining tool (14) attached interchangeably to this, the machining tool (14) has a hollow cylindrical shaft part (18) which overlaps a receiving mandrel (20) on the holder part (12) and is fixed to the holder part (12) by means of a screw device (28, 30) mounted on the holder part (12) and generating a tension or compression force via a tension or compression rod (22) running through the holder part (12) and the receiving mandrel (20). The end of the tension or compression rod (22) facing the machining tool (14) is expanded and under the effect of the tension or compression force leads to an expansion of the receiving mandrel (20) such that the peripheral surface (42) of the receiving mandrel (20) and the inner surface (44) of the shaft part (18) are clamped against each other to form a friction connection.

11 Claims, 1 Drawing Sheet

FRICTIONALLY CLAMPED TOOL AND HOLDER

BACKGROUND OF THE INVENTION

The invention concerns a machining tool with a holder part for clamping in a spindle of a turning machine, where the machining tool is interchangeably attached to the holder part.

For interchangeable attachment of a machining tool such as for example a milling cutter, drill or thread cutter onto a holder part provided for clamping in a spindle of a turning machine, it is known to insert the machining tool in a threaded bore arranged centrally in the holder part via a screw thread formed integrally on the rear of the tool, and tighten this with a screwdriver. In another fixing manner, the machining tool is screwed to the holder part via an axial bore through the tool head.

One essential disadvantage of both above mentioned connections between the machining tool and the holder part is that frequently an imbalance occurs and this causes problems of concentricity. Screwing through the screw head is also not possible with center cutting tools.

The invention is therefore based on the task of designing the fixing of a machining tool to a holder part such that no imbalance problems occur. The machining tool should also be simple and quick to replace. A further objective is the universal application of one holder part for different types of machining tools, i.e. the creation of a modular system.

SUMMARY OF THE INVENTION

To solve the task according to the invention, the machining tool has a hollow cylindrical shaft part which overlaps a receiving mandrel on the holder part and is fixed to the holder part by means of a screw device mounted on the holder part and generating tension or compression force by way of a tension or compression rod extending through the holder part and the receiving mandrel; where the end of the tension or compression rod facing the machining tool is expanded, and under the effect of the tension or compression force leads to an expansion of the receiving mandrel, such that, the peripheral surface of the receiving mandrel and the inner surface of the shaft part are clamped together to form a friction connection.

The device according to the invention gives a symmetrical construction and allows an essential reduction in mass in comparison with previously known solutions in the field of fixing of the machining tool and the holder part. Even when used at high rotation speeds, the machining tool runs concentric and is held firmly seated in the holder part by means of the rear fixing via the tension or compression rod.

Suitably the inner surface of the receiving mandrel is expanded conically towards its free end and forms a support for the expanded end of the tension or compression rod, which can also be conically expanded corresponding to the conical expansion of the receiving mandrel.

In a preferred design of the expanded end of the tension or compression rod, this is formed as an annular ring. The resulting point-like support on the cone surface of the receiving mandrel has an advantage over a broad surface support in that this area of the tension or compression rod does not require any high precision, such that the production costs can be reduced.

For optimum seating of the shaft part on the receiving mandrel, it can prove advantageous to form the inner surface of the shaft part as a slight cone tapering towards the holder part.

Although the friction connection between the peripheral surface of the receiving mandrel and the inner surface of the shaft part should be adequate for most machining tools and types, additional security against twisting can be provided in the form of at least one connecting element between the holding part and the shaft part. In a preferred form of security against twisting, pins inserted in bores in the face of the holder part engage in recesses or grooves on the face of the shaft part.

The machining tool is clamped to the holder part in the simplest case via a nut which is placed at one end of the thread on the tension or compression rod and serves as a counter stop. To lock the nut against unintentional release, suitably a lock screw is guided in a thread in the holder part.

In a particularly advantageous design of the screw device, both the nut and the lock screw have a polygonal socket head, where the polygonal socket of the nut can be operated without hindrance through the lock screw. The preferred polygonal socket is a conventional hexagonal socket, but other design forms such as for example a square or octagonal socket can be used.

In this arrangement, the machining tool can easily be replaced as turning the nut causes the tension or compression rod to move against the machining tool such that the friction connection is released. When the machining tool is fixed to the holder part in accordance with the invention, a modular system is created which is suitable in particular for rapid and easy clamping of milling cutters, drills and thread cutters.

BRIEF DESCRIPTION OF THE DRAWINGS

Further advantages, features and details of the invention are shown in the following description of a preferred design example and the drawing, where.

DETAILED DESCRIPTION

Figure 1:
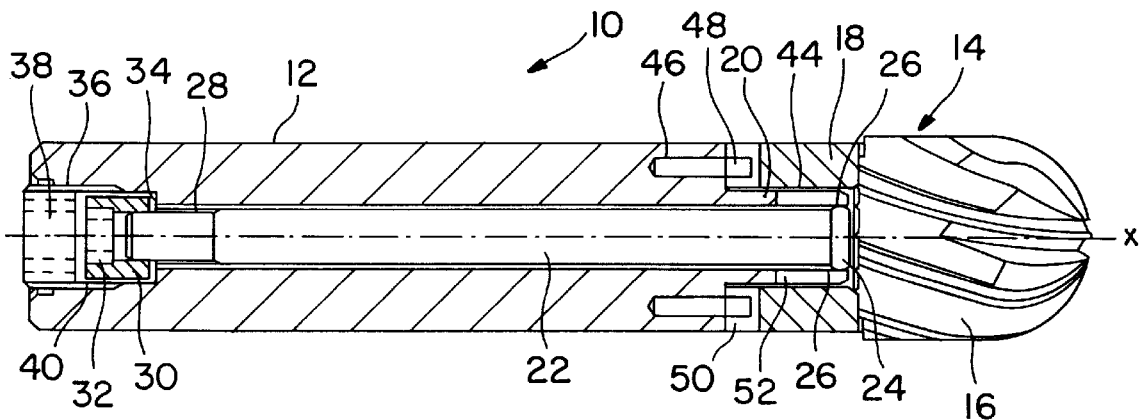
FIG. 1 shows a longitudinal section through a holder part with a machining tool attached.

A modular milling cutter system 10 shown in FIG. 1 for clamping in a spindle of a milling machine, not shown in the drawing for reasons of clarity, has an essentially tubular holder part 12 which defines a tool axis x. A milling cutter or generally a machining tool 14 is placed on the holder part 12 in tool axis x.

The machining tool 14 has a hollow cylindrical shaft part 18 projecting from the actual machining head 16 which overlaps a receiving mandrel 20 projecting centrally from the holder part 12.

Figure 2:
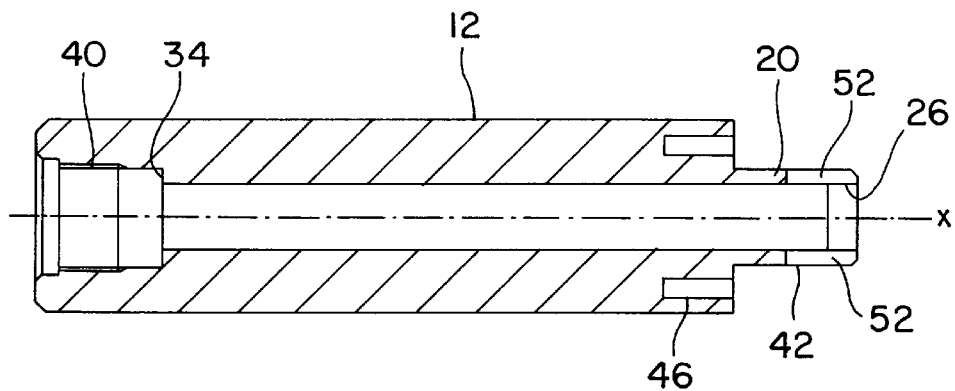
FIG. 2 shows a longitudinal section through the holder part of the arrangement in FIG. 1.
Figure 3:
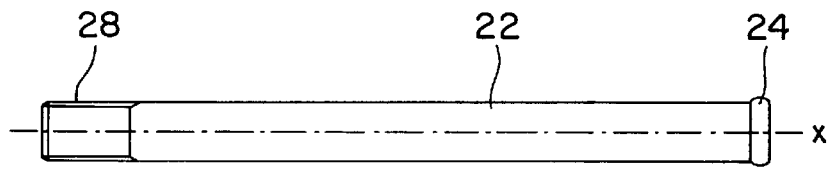
FIG. 3 shows a longitudinal section through the tension rod of the arrangement in FIG. 1.

A tension rod 22 runs through the holder part 12 and the receiving mandrel 20. The tension rod 22 has at its end next to the machining tool 14 an enlarged portion such as an annular ring 24 which lies with the area of its free end sliding on the inner surface of the receiving mandrel 20. In this area of contact of the annular ring, the receiving mandrel 20 has a conical expansion 26 towards its open end. For better understanding of the structure of the modular system 10, the holder part 12 and the tension rod are shown individually in FIGS. 2 and 3.

At its end opposite the annular ring 24, the tension rod 22 has a thread 28. A nut 30 with a hexagonal socket 32 is screwed onto the threaded end of tension rod 22 and when the tension force is applied this lies on the contact surface 34 of the holder part 12. The tension force generated by tightening the nut 30 pulls the annular ring 24 along the conical expansion 26 towards the receiving mandrel 20 such that this is expanded and with its peripheral surface 42 lies on the inner surface 44 of the shaft part 18 forming a friction connection. The inner surface 44 is expanded conically slightly towards the head 16 for optimum seating between the machining tool 14 and the holder part 12.

The expansion necessary to expand the receiving mandrel 20 can then be produced by a correspondingly reduced wall thickness of the receiving mandrel. Another simple possibility is the application of for example four longitudinal slots 52.

To secure nut 30 against accidental release, a lock screw 36 is provided which engages in the inner thread 40 of the holder part 12. The lock screw 36 has a through hexagonal socket 38 which has a greater diameter than the hexagonal socket 32 of nut 30 so that this can be operated without hindrance through the lock screw 36. In this arrangement the machining tool 14 can easily be removed from the holder part 12 as by turning the nut 30 supported on the lock screw 36, the tension rod 22 moves in the direction of the machining tool 14 which releases the friction connection between the inner surface 44 of the shaft part 18 and the peripheral surface 42 of the receiving mandrel 20.

As further security against twisting of the machining tool 14 on the holder part 12, between the two parts is fitted a connection piece. For this, bores 46 are provided in the holder part 12 starting from its face to hold the pins 48, which project a few millimeters from the front end of the holder part 12. To hold the pins 48 in the machining tool 14, in the face of the shaft part 18 are machined corresponding recesses or grooves 50. Instead of the grooves 50, bores can also be provided.

What is claimed is:

1. Machining tool with a holder part for clamping in a spindle of a turning machine, where the machining tool is interchangeably attached to the holder part, characterized in that the machining tool has a hollow cylindrical shaft part which overlaps a receiving mandrel on the holder part and is fixed to the holder part by means of a screw device mounted on the holder part, wherein a tension or compression force is generated by way of a tension or compression rod extending through the holder part and the receiving mandrel, where a first end of the tension or compression rod which is in closest proximity to the machining tool is enlarged and under the effect of the tension or compression force leads to an expansion of the receiving mandrel such that a peripheral surface of the receiving mandrel and an inner surface of the shaft part are clamped together to form a friction connection, wherein said screw device mounted on the holder part is connected with a second end of the tension or compression rod; and wherein said tension or compression rod, said receiving mandrel, and said hollow cylindrical shaft part have a common longitudinal axis.

2. Machining tool according to claim 1, characterized in that the inner surface of the receiving mandrel has a conically expanded portion adjacent its free end and forms a support for the enlarged end of the tension or compression rod.

3. Machining tool according to claim 2, characterized in that the enlarged end of the tension or compression rod is formed conically has a conically shaped portion which corresponds to said conically shaped portion of the receiving mandrel.

4. Machining tool according to claim 2, characterized in that the enlarged end of the tension or compression rod is formed as an annular ring.

5. Machining tool according to claim 1, characterized in that the receiving mandrel has at least one longitudinal slot to support its expansion.

6. Machining tool according to claim 1, characterized in that the inner surface of the shaft part is conically tapered towards the holder part.

7. Machining tool according to claim 1, characterized in that between the holder part and the shaft part is arranged at least one connecting element as security against twisting.

8. Machining tool according to claim 1, characterized in that the tension or compression rod has a thread at one end and a nut placed on this as a counter stop to generate the tension or compression force.

9. Machining tool according to claim 8, characterized in that the nut is locked with a lock screw guided in a thread in the holder part.

10. Machining tool according to claim 9, characterized in that the nut and the lock screw have polygonal sockets where the polygonal socket of the nut can be operated without hindrance through the lock screw.

11. Machining tool according to claim 7, wherein said at least one connecting element comprises a plurality of pins inserted in bores in a face of the holder part and wherein said pins engage recesses or grooves arranged in a face of the shaft part.

\* \* \* \* \*

UNITED STATES PATENT AND TRADEMARK OFFICE
CERTIFICATE OF CORRECTION

PATENT NO. : 6,053,670
DATED : April 25, 2000
INVENTOR(S) : Konrad Schmid

It is certified that error appears in the above-identified patent and that said Letters Patent is hereby corrected as shown below:

Column 3,
Lines 12-14, delete "Another simple possibility is the application of for example four longitudinal slots 52." and insert therefor --This expansion is possible due to the presence of at least one longitudinal slot 52.--.

Column 4,
Claim 3, lines 15-16, delete "is formed conically".
Claim 11, lines 42-43, delete "7, wherein said at least one connection element comprises" and insert therefor --1, characterized in that between the holder part and the shaft part are arranged--.

Signed and Sealed this

Seventeenth Day of July, 2001

*Attest:*

*Attesting Officer*

NICHOLAS P. GODICI
*Acting Director of the United States Patent and Trademark Office*